(12) United States Patent
Hofmann et al.

(10) Patent No.: US 12,224,697 B2
(45) Date of Patent: Feb. 11, 2025

(54) START-UP MODE FOR A POWER TOOL

(71) Applicant: Festool GmbH, Wendlingen (DE)

(72) Inventors: Tobias Hofmann, Kirchheim (DE); Norbert Morgenstern, Böblingen (DE)

(73) Assignee: Festool GmbH, Wendlingen (DE)

( * ) Notice: Subject to any disclaimer, the term of this patent is extended or adjusted under 35 U.S.C. 154(b) by 0 days.

(21) Appl. No.: 18/044,314

(22) PCT Filed: Jul. 22, 2021

(86) PCT No.: PCT/EP2021/070518
§ 371 (c)(1),
(2) Date: Mar. 7, 2023

(87) PCT Pub. No.: WO2022/053214
PCT Pub. Date: Mar. 17, 2022

(65) Prior Publication Data
US 2024/0313676 A1 Sep. 19, 2024

(30) Foreign Application Priority Data
Sep. 9, 2020 (DE) ...................... 10 2020 211 311.4

(51) Int. Cl.
*H02P 1/40* (2006.01)
*B24B 23/02* (2006.01)
*H02P 6/21* (2016.01)

(52) U.S. Cl.
CPC ................ *H02P 6/21* (2016.02); *B24B 23/02* (2013.01)

(58) Field of Classification Search
CPC .................................. H02P 6/21; B24B 23/02
See application file for complete search history.

(56) References Cited

U.S. PATENT DOCUMENTS 11,855,567 B2 * 12/2023 Friedman ............... B25B 21/023
2013/0076279 A1 * 3/2013 Abel ........................ H02P 1/40
318/139

(Continued)

FOREIGN PATENT DOCUMENTS

DE 20 2008 010 458 U 1/2009
DE 10 2010 012 023 9/2011

(Continued)

OTHER PUBLICATIONS

Examination Report issued in corresponding German Patent Application No. 10 2020 211 311.4, Apr. 19, 2021, 6 pages.

(Continued)

*Primary Examiner* — Muhammad S Islam
(74) *Attorney, Agent, or Firm* — HSML P.C.

(57) ABSTRACT

A power tool, in particular a handheld power tool, for example a grinding machine, that includes a tool, an electric motor for driving the tool, and a control unit for actuating the electric motor using a motor current (MI). The control unit has a start-up mode in which the control unit actuates the electric motor in such a way that the electric motor during the start-up mode traverses a rotational speed ramp (DR), at which the rotational speed of the electric motor is increased continuously up to operating rotational speed (ADZ) The control unit is designed to adjust the gradient of the rotational speed ramp (DR) on the basis of an acquired temperature for the start-up mode and/or to adjust the intensity of the motor current (MI) on the basis of the acquired temperature for the start-up mode.

20 Claims, 4 Drawing Sheets

(56) References Cited

U.S. PATENT DOCUMENTS

| | | |
|---|---|---|
| 2018/0278187 A1 | 9/2018 | Tian |
| 2020/0259395 A1 | 8/2020 | Lewis et al. |
| 2021/0187635 A1 | 6/2021 | Lu et al. |
| 2021/0394326 A1 | 12/2021 | Wiker et al. |

FOREIGN PATENT DOCUMENTS

| | | |
|---|---|---|
| DE | 10 2014 219 393 | 3/2016 |
| DE | 10 2017 216 697 | 3/2019 |
| EP | 1 961 524 | 8/2008 |
| EP | 3 840 211 | 6/2021 |
| WO | 2020/057552 | 3/2020 |

OTHER PUBLICATIONS

International Search Report issued in International Application No. PCT/EP2021/070518 issued Oct. 15, 2021, 6 pages w/translation.
Written Opinion issued in International Application No. PCT/EP2021/070518 issued Oct. 15, 2021, 6 pages.

\* cited by examiner

START-UP MODE FOR A POWER TOOL

SUMMARY OF THE INVENTION

The invention relates to a power tool, in particular a hand-held power tool, for example a sander, comprising a tool, an electric motor for driving the tool, and a control unit for driving the electric motor with a motor current. The control unit has a start-up mode in which the control unit drives the electric motor such that the electric motor goes through a rotational speed ramp during the start-up mode, in which rotational speed ramp the rotational speed of the electric motor is continuously increased up to a working rotational speed. For example, in the start-up mode, the control unit continuously increases the frequency of the motor current to achieve the continuous increase in the rotational speed of the electric motor.

The power tool is controlled from the time the working rotational speed is reached preferably using a sensorless principle, in particular using a Back-EMF principle. EMF stands for electromotive force. The power tool expediently does not comprise a position sensor for detecting the present rotor angle of the electric motor. The control unit determines the present rotor angle and/or the present rotational speed of the electric motor without a sensor, for example on the basis of an electrical variable of the electric motor, in particular a current (e.g. the motor current) and/or a voltage. Once the working rotational speed has been reached, the power tool commutates the electric motor on the basis of the present rotor angle (in particular determined without a sensor) and/or the present rotational speed (in particular determined without a sensor).

Before the working rotational speed is reached—i.e. in startup mode—the control unit expediently does not use the sensorless principle, e.g. because the sensorless principle only works from a certain minimum rotational speed—the working rotational speed.

The rotational speed ramp is to be designed for the startup mode in such a way that the electric motor can perform the rotational speed ramp under different conditions, in particular with a different internal mechanical load acting on the electric motor. The internal mechanical load to be taken into account when designing the rotational speed ramp is, in particular, a moment of inertia that counteracts the drive of the rotor.

It is to be avoided that (e.g. due to a too steep rotational speed ramp in the start-up mode) the rotor of the electric motor can no longer follow the electric field provided by the electric motor based on the motor current, and the start-up of the electric motor fails. In particular, if there is no determination and/or no consideration of the present rotor angle and/or the present rotational speed in the startup mode, it is usually not possible to detect during the startup mode that the electric motor is accelerating too slowly (e.g., due to the internal mechanical load) for a present rotational speed ramp and, accordingly, it is usually not possible to react in such a case during the startup mode by reducing the slope of the rotational speed ramp and/or by increasing the motor current. For this reason, the rotational speed ramp must be designed flat enough in advance so that the electric motor can follow the rotational speed ramp even with a larger internal mechanical load. However, a flat rotational speed ramp will cause the startup mode to take longer.

It is an object of the invention to improve the start-up mode.

The object is solved by a power tool according to claim 1. The control unit of the power tool is configured to set the slope of the rotational speed ramp for the start-up mode on the basis of a detected temperature and/or to set the current strength of the motor current for the start-up mode on the basis of the detected temperature.

The internal mechanical load—i.e. in particular the moment of inertia—which counteracts the drive of the tool, exhibits a temperature dependence. The recorded temperature can be used to infer the magnitude of the internal mechanical load and the rotational speed ramp can be adapted to the internal mechanical load. This means that the rotational speed ramp no longer always has to be designed for the "worst case"—i.e. the greatest internal mechanical load—but can be adapted to the current internal mechanical load in accordance with the detected temperature. This makes it possible to perform the startup mode more quickly, especially in cases where the greatest internal mechanical load is not present.

Advantageous further developments are the subject of the subclaims.

The invention further relates to a system comprising the power tool and a mobile device via which the start-up mode can be configured.

The invention further relates to a method for providing a start-up mode for a power tool comprising a tool and an electric motor for driving the tool, wherein the electric motor undergoes a rotational speed ramp during the start-up mode in which rotational speed ramp the rotational speed of the electric motor is continuously increased up to a working rotational speed, the method comprising the steps of: detecting a temperature, setting a slope of the rotational speed ramp for the start-up mode on the basis of the detected temperature and/or setting a current strength of a motor current for the start-up mode on the basis of the detected temperature, providing the start-up mode with the set slope of the rotational speed ramp and/or the set strength of the motor current.

The invention further relates to an arrangement comprising an electric motor for driving a tool and a control unit for driving the electric motor with a motor current, wherein the control unit has a start-up mode in which the control unit drives the electric motor so that the electric motor runs through a rotational speed ramp during the start-up mode, in which rotational speed ramp the rotational speed of the electric motor is continuously increased up to a working rotational speed, the control unit being configured to set the slope of the rotational speed ramp for the start-up mode on the basis of a detected temperature and/or to set the strength of the motor current for the start-up mode on the basis of a/the detected temperature.

The invention further relates to a computer program product comprising instructions that cause the power tool to perform the process steps.

The invention further relates to a computer-readable medium on which the computer program is stored.

The invention further relates to a method comprising the step of: loading the computer program product onto a power tool.

BRIEF DESCRIPTION OF THE DRAWINGS

Further exemplary details as well as exemplary embodiments are explained below with reference to the figures. Thereby shows FIG. 1 a schematic representation of a system comprising a power tool, a mobile device and a workpiece, FIG. 2 a schematic representation of a head section of the power tool, FIG. 3 a schematic representation of an electric motor, a control unit, a temperature sensor and an operating device of the power tool

DETAILED DESCRIPTION OF THE INVENTION

Figure 1:
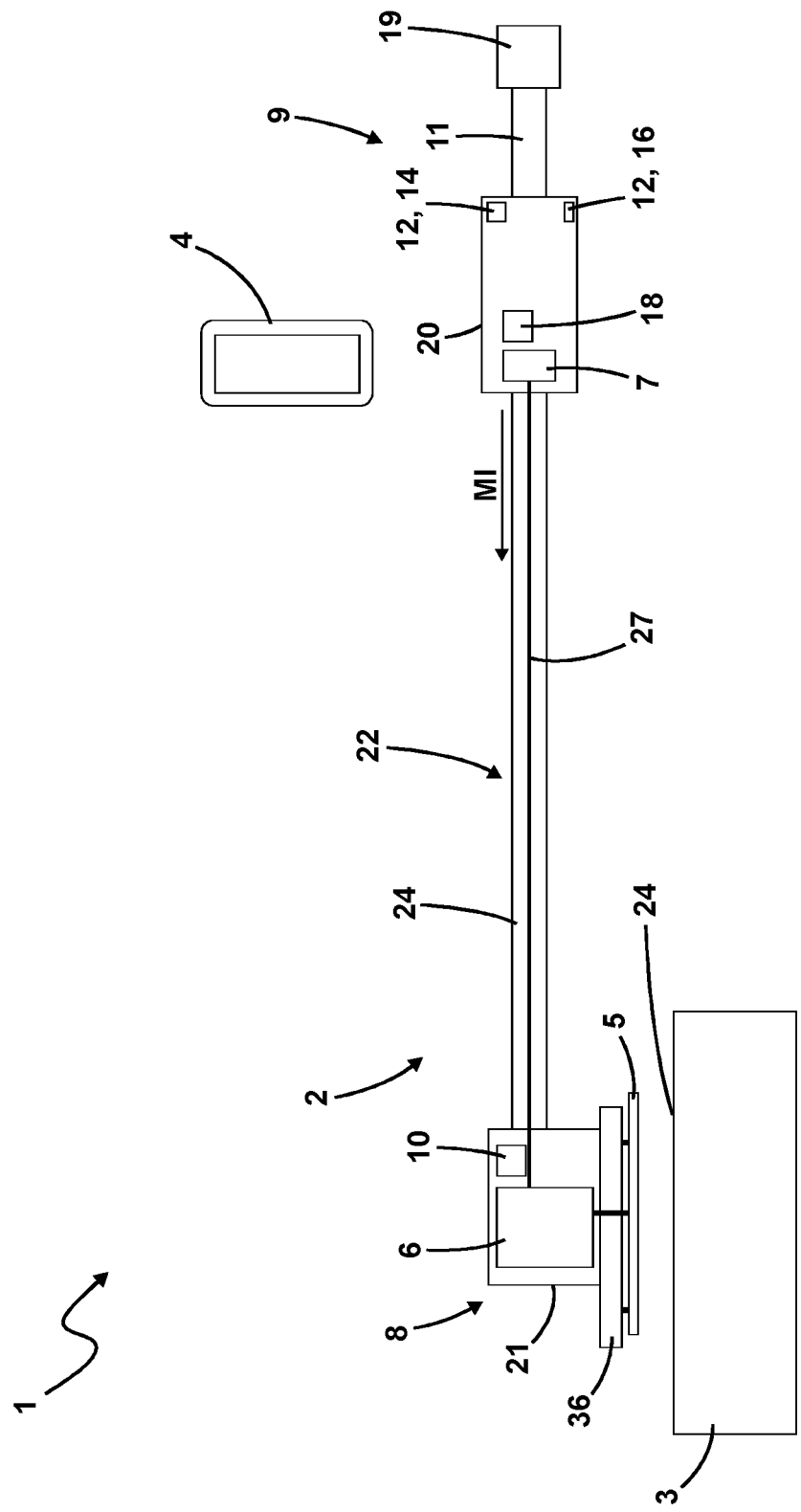

FIG. 1 shows a system 1 comprising a power tool 2, a workpiece 3 and optionally a mobile device 4. The system 1 represents a purely exemplary application environment for the power tool 2. The power tool 2 can also be provided on its own—i.e. without the further components of the system 1.

The power tool 2 is exemplarily a hand-held power tool. The power tool 2 can be gripped, carried and/or guided by a user with one or two hands. Exemplarily, the power tool 2 is a sander, in particular an eccentric sander. Exemplarily, the power tool 2 is a long-neck sander, in particular a long-neck eccentric sander. The power tool 2 may further be an eccentric polisher.

The power tool 2 comprises a tool 5, which is exemplarily designed as a sanding tool, in particular as a sanding disc. The power tool 2 further comprises an electric motor 6 for driving the tool 5. The electric motor 6 is exemplarily designed as an electronically commutated, in particular as a sensorless commutated electric motor. In particular, the electric motor 6 is designed as a brushless DC motor, BLDC motor. The electric motor 6 provides a rotary drive movement, on the basis of which the tool 5 is set into a working movement.

Figure 4:
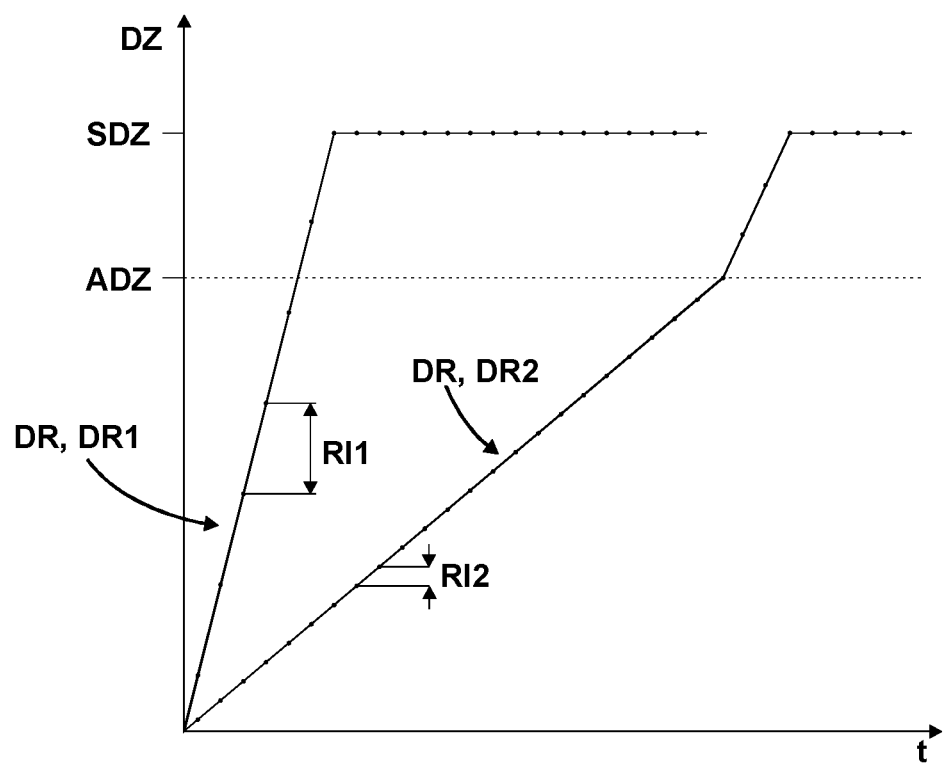
FIG. 4 shows a diagram with two rotational speed ramps of different slopes.

The power tool 2 further comprises a control unit 7 for driving the electric motor 6 with a motor current MI. The control unit 7 has a start-up mode in which the control unit 7 drives the electric motor 6 in such a way that the electric motor 6 goes through a rotational speed ramp DR during the start-up mode, in which rotational speed ramp DR the rotational speed of the electric motor 6 is continuously increased up to a working rotational speed ADZ. Exemplary rotational speed ramps DR are shown in FIG. 4. The control unit 7 is configured to set the slope of the rotational speed ramp DR for the start-up mode on the basis of a detected temperature and/or to set the current strength of the motor current MI for the start-up mode on the basis of a/the detected temperature. By the current strength of the motor current MI is meant in particular the amplitude of the motor current MI.

Exemplarily, the power tool 2 comprises a head section 8 comprising the tool 5. Preferably, the head section 8 comprises the electric motor 6. According to an alternative embodiment, the electric motor 6 may be arranged in another section of the power tool 2, for example in a user section 9. Optionally, the head section 8 comprises a head section temperature sensor 10, which may also be referred to as a second temperature sensor.

Exemplarily, the power tool 2 comprises the user section 9. The user section 9 comprises, in particular, a handle section 11 which can be gripped by a user with his hand in order to carry and/or guide the power tool 2. Exemplarily, the user section 9 comprises an operating device 12, by means of which the drive of the tool 5, which takes place by means of the electric motor 6, can be switched on and/or switched off and/or by means of which a target rotational speed for the electric motor 6 can be set. In particular, the operating device 12 comprises a first operating element 14, which is designed in particular as a switch and via which the drive of the tool 5 effected by means of the electric motor 6 can be switched on and/or switched off. Exemplarily, the operating device 12 comprises a second operating element 16, which is designed in particular as a rotary wheel and via which the target rotational speed for the electric motor 6 can be expediently set.

Exemplarily, the user section 9 further comprises the control unit 7. According to an alternative embodiment, the control unit 7 may be arranged in another section of the power tool 2, in particular in the head section 8. The power tool 2, in particular the user section 9, comprises a user section temperature sensor 18, which may also be referred to as a first temperature sensor.

The power tool 2 is expediently configured to detect the temperature (on the basis of which the slope of the rotational speed ramp DR and/or the magnitude of the motor current MI is adjusted) with the first temperature sensor 18. Exemplarily, the first temperature sensor 18 is arranged at a distance from the electric motor 6. In particular, the first temperature sensor 18 is spaced apart from the electric motor 6 and/or thermally insulated so that the temperature detected by the first temperature sensor 18 is expediently not influenced by the heat emitted by the electric motor 6. Exemplarily, the electric motor 6 is arranged on a first side of a neck section 22 and the first temperature sensor 18 is arranged on a second side of the neck section 22, the second side facing away from the electric motor 6.

Optionally, the user section 9 has a hose port 19 to which a suction hose can be connected. The hose port 19 is fluidically connected to a suction opening provided on the head section 8 via an air channel running through the power tool 2.

Exemplarily, the user section 9 has a user section housing 20. In particular, the control unit 7 and/or the first temperature sensor 18 are arranged in the user section housing 20. Exemplarily, the operating device 12, in particular the first operating element 14 and/or the second operating element 16, is arranged on the user section housing 20. Exemplarily, the handle section 11 is attached to the user section housing 20. The hose port 19 is attached to the handle section 11 in an exemplary manner.

The head section 8 has, by way of example, a head section housing 21 in which, in particular, the electric motor 6 and/or the head section temperature sensor 10 are arranged.

According to a possible embodiment, the control unit 7 is designed to determine the temperature, on the basis of which the control unit 7 sets the slope of the rotational speed ramp DR and/or the strength of the motor current for the start-up mode, by means of a plurality of temperature sensors, in particular by means of the first temperature sensor 18 and the second temperature sensor. In particular, the control unit 7 detects a first temperature value via the first temperature sensor 18 and a second temperature value via the second temperature sensor and sets the slope of the rotational speed ramp DR and/or the strength of the motor current for the start-up mode based on the first temperature value and the second temperature value. For example, the control unit calculates the temperature on the basis of which the control unit 7 sets the slope of the rotational speed ramp DR and/or the strength of the motor current for the start-up mode from the first temperature value and the second temperature value, for example as an average value.

Exemplarily, the power tool 2 comprises the neck section 22, which expediently comprises a neck element 24, in particular of rod-shaped design. The neck section 22, in particular the neck element 24, connects the head section 8, in particular the head section housing 21, to the user section 9, in particular the user section housing 20. Expediently, an electrical line 27 runs through the neck section 22, in particular through the neck element 24, via which the control unit 7 supplies the motor current MI to the electric motor 6. Furthermore, expediently, the aforementioned air channel runs through the neck section 22, in particular through the neck element 24.

The power tool 2 expediently has an elongated basic shape extending in a longitudinal direction. Exemplarily, the neck section 22, in particular the neck element 24, occupies at least 30%, at least 40% or at least 50% of the longitudinal extension of the power tool 2.

The workpiece 3 shown in FIG. 1 has, by way of example, a workpiece surface 24 that can be machined, in particular sanded and/or polished, with the tool 5. The workpiece 3 is, for example, a wall, in particular a ceiling wall and/or side wall, of a building. The surface of the wall is sanded with the tool 5, in particular the sanding disc.

The mobile device 4 is expediently designed as a smartphone or tablet. In particular, the mobile device 4 is designed to communicate with the power tool 2, in particular the control unit 7, preferably wirelessly, for example via Bluetooth, NFC, WLAN and/or mobile radio.

Figure 2:
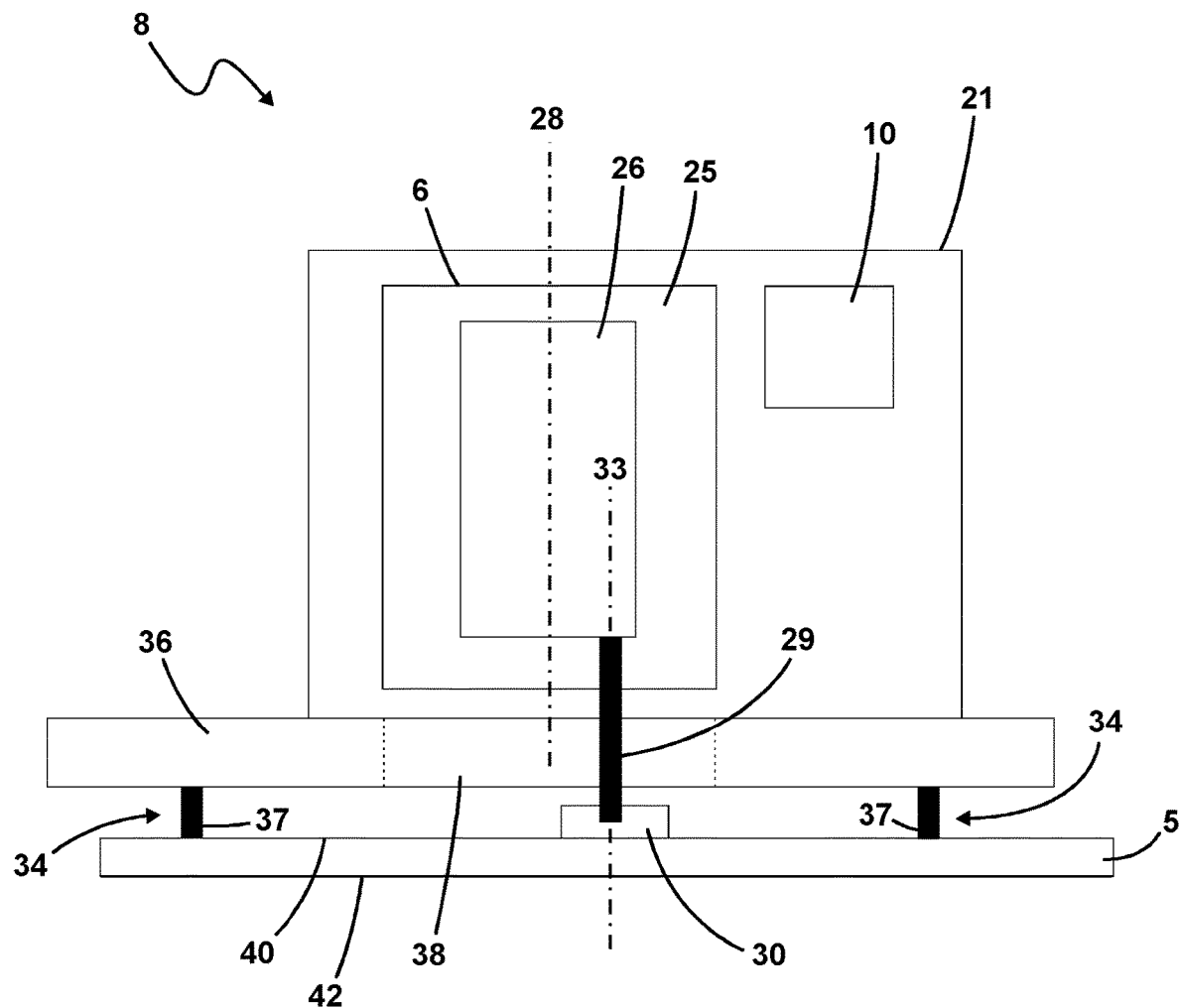

FIG. 2 shows an exemplary detailed view of the head section 8. The electric motor 6 comprises a stator 25 and a rotor 26, which can be set into the drive rotary movement relative to the stator 25. The rotor 26 is mounted for rotation about a rotor rotation axis 28. The drive rotary movement of the rotor 26 takes place about this rotor rotation axis 28.

The rotor 26 comprises an eccentric section 29, which is arranged eccentrically to the rotor rotation axis 28. When the rotor 26 performs its drive rotary movement about the rotor rotation axis 28, the eccentric section 29 moves on a circular path about the rotor rotation axis 28. The tool 5 is coupled to the eccentric section 29, so that the tool 5 is set into working movement by the movement of the eccentric section 29. Exemplarily, the power tool 2 has a pivot bearing 30 through which the tool 5 is coupled to the eccentric section 29. The pivot bearing 30 defines a tool rotation axis 33 about which the tool 5 is rotatable relative to the eccentric section 29. Exemplarily, the tool rotation axis 33 runs through the center of the tool 5, which is in particular designed as a sanding disc. The tool rotation axis 33 is in particular aligned parallel to the rotor rotation axis 28 and arranged offset thereto. Due to the fact that the tool 5 is rotatably mounted relative to the eccentric section 29, the tool 5 is in particular able to perform an unbound rotation as the working movement. In the unbound rotation, the own rotation of the tool 5—that is, the rotation of the tool 5 about the tool rotation axis 33—is expediently independent of the drive rotation movement.

The power tool 2, in particular the head section 8, expediently further has a braking device 34 which is designed to brake the tool 5, in particular relative to a stationary section 36 of the power tool 2. The braking device 34 can also be referred to as a disk brake. In particular, the braking device 34 serves to slow down the own rotation of the tool 5 (relative to the stationary section 36) when the power tool 2 is idle, i.e. when the tool 5 is not yet in contact with the workpiece 3, in particular the workpiece surface 24. By slowing down the own rotation of the tool 5, scoring that occurs when the tool 5 touches the workpiece 3, in particular the workpiece surface 24, can be reduced or prevented.

In particular, the stationary section 36 is stationary relative to the stator 25 and/or the head section housing 21. The stationary section 36 does not follow the drive rotary movement. The stationary section 36 is, for example, disk-shaped and expediently has an opening 38 through which the rotor 26, in particular the eccentric section 29, is led out.

Exemplarily, the braking device 34 comprises a braking element 37, which is arranged in particular between the tool 5 and the stationary section 36. The braking element 37 is designed in particular to be elastic and/or ring-shaped. The braking element 37 is in particular designed as a rubber ring, preferably as an ring-shaped rubber sleeve. The braking element 37 is in particular a diaphragm and/or a lamella. The braking element 37 rotates around the tool rotation axis 33. The braking element 37 is expediently attached to the tool 5, so that it moves along with the tool 5 and in particular performs the working movement together with the tool 5. Expediently, the braking element 37 rubs against the stationary section 36, thereby braking the tool 5 relative to the stationary section 36. According to an alternative embodiment, the braking element 37 is attached to the stationary section 36 and rubs against the tool 5, thereby braking the tool 5 relative to the stationary section 36.

The tool 5 is designed in particular as a sanding disc. The tool 5 has a in particular disk-shaped tool upper side 40 and/or a in particular disk-shaped tool lower side 42. The tool upper side 40 and/or the tool lower side 42 are expediently aligned perpendicular to the tool rotation axis 33. The tool upper side 40 is expediently in contact with the braking element 37. For example, the braking element 37 is attached to the tool upper side 40. Alternatively, the braking element 37 rubs against the tool upper side 40. The tool lower side 42 is expediently formed by an sanding means, in particular a sanding disc. The power tool 2 can be placed with the tool lower side 42 on the workpiece 3, in particular the workpiece surface 24, in order to process the workpiece 3, in particular to sand it.

Figure 3:
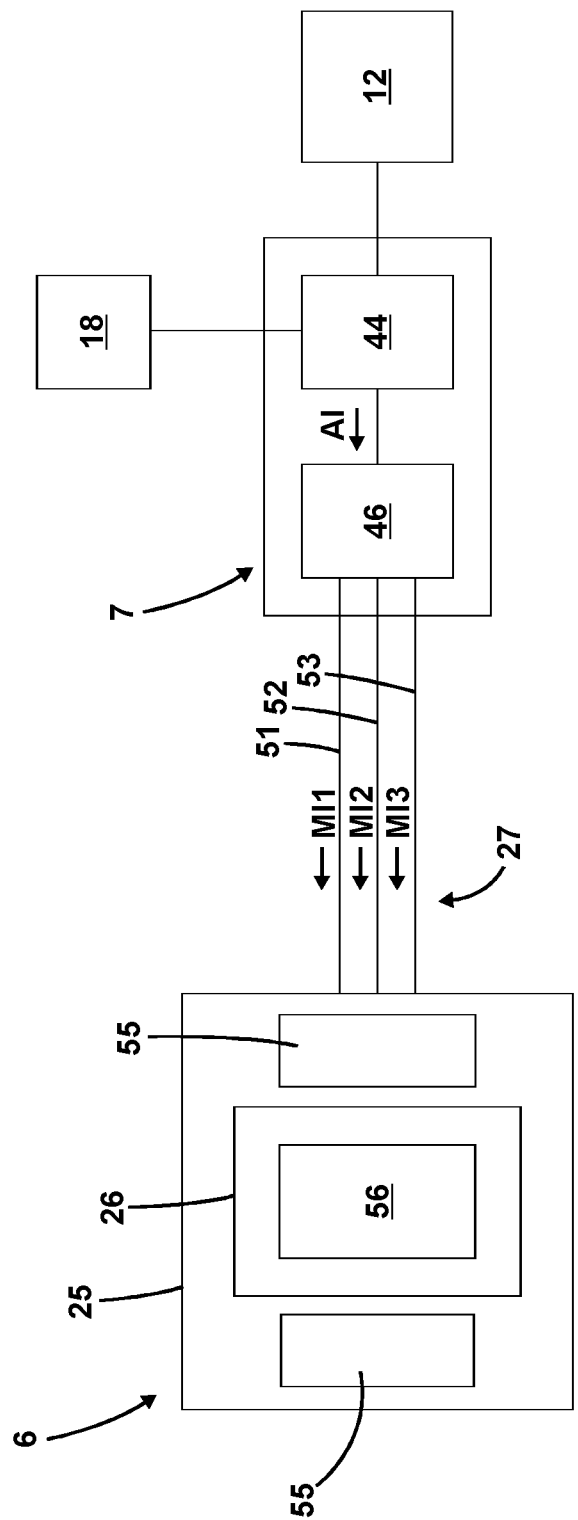

FIG. 3 shows a schematic representation of the electric motor 6, the control unit 7, the first temperature sensor 18 and the operating device 12.

The control unit 7 comprises, by way of example, a computer unit 44 and a power unit 46. The computer unit 44 is designed in particular as a microcontroller and preferably comprises a processor. The power unit 46 is designed in particular as power electronics. The computer unit 44 is designed to calculate drive information AI, on the basis of which the power unit 46 drives the electric motor 6. In particular, the power unit 46 provides the motor current MI on the basis of the drive information AI. Exemplarily, the motor current MI comprises three motor currents—a first motor current MI1, a second motor current MI2, and a third motor current MI3. The drive information AI expediently specifies frequency, amplitude and/or phase for the motor currents MI1, MI2, MI3. The electrical line running from the control unit 7 to the electric motor 6 expediently comprises at least three wires—a first wire 51, a second wire 52 and a third wire 53, with a respective motor current MI1, MI2, MI3 being transmitted via each wire 51, 52, 53.

The electric motor 6, in particular the stator 25, has a plurality of coils 55, each of the coils 55 being energized with a respective motor current MI1, MI2, MI3 to cause the drive rotation of the rotor 26. The electric motor 6, in particular the rotor 26, has a permanent magnet 56 which expediently magnetically interacts with the magnetic field provided by the coils 55 and thereby results in the drive rotary movement of the rotor 26.

The control unit 7 has the aforementioned start-up mode and a working mode, which will be explained in more detail below.

In the working mode, the rotor 26 rotates at a present rotational speed which is in particular greater than or equal to the working rotational speed ADZ. The present rotational speed is expediently equal to the target rotational speed. In the working mode, the working movement of the tool 5 is fast enough to machine the workpiece 3.

The control unit 7 is designed to perform the commutation of the electric motor 6 in the working mode using a sensorless principle for determining a present angle of the rotor and/or a present rotational speed of the electric motor 6. In particular, the control unit 7 is designed to commutate the electric motor in the working mode without a sensor—that is, on the basis of a sensorless principle. The sensorless principle is in particular a Back-EMF principle. Preferably, the power tool 2 does not have a position sensor for detecting the present rotor angle and/or the present rotational speed of the electric motor 6.

For example, the control unit 7 determines the present rotor angle and/or the present rotational speed of the electric motor 6 on the basis of a countervoltage generated in the coils 55 (which can be tapped in particular via the electrical line 27) and performs commutation of the electric motor 6 on the basis of the present rotor angle and/or the present rotational speed—for example, by providing the motor currents MI1, MI2, MI3.

In particular, the control unit 7 performs a closed-loop rotational speed control in the working mode, in which closed-loop rotational speed control the control unit 7 adjusts the motor currents MI1, MI2, MI3, in particular their frequency and/or current strength, so that the present rotational speed of the electric motor 6 detected (in particular without sensors) corresponds to the target rotational speed entered in particular via the operating device 12. For example, the computer unit 44 calculates the drive information AI for the power unit 46 on the basis of the target rotational speed, the (in particular sensorless) detected present rotational speed and/or the (in particular sensorless) detected present rotor angle, and the power unit 46 provides the motor currents MI1, MI2, MI3 on the basis of the drive information AI. The control information AI specifies, for example, the frequency, phase and/or current strength of the motor currents MI1, MI2, M3.

As an example, the sensorless principle for detecting the present rotor angle and/or the present rotational speed only functions once a minimum rotational speed—the working rotational speed ADZ—of the rotor 26 has been reached. The sensorless principle does not function below the working rotational speed ADZ.

In order to achieve the working rotational speed ADZ, the control unit 7 has the start-up mode in which the control unit 7 can increase the rotational speed of the rotor 26 up to the minimum rotational speed (in particular starting from a standstill of the rotor 26) without detecting and/or taking into account the rotor angle and/or the rotational speed for this purpose. The control unit 7 is expediently designed to carry out the control of the electric motor 6 in the start-up mode without detecting and/or taking into account the present rotor angle of the electric motor 6 and/or the present rotational speed of the electric motor 6. In particular, in the start-up mode, an "open-loop" control—i.e., in particular, a pure open-loop control (and no closed-loop control)—of the rotational speed of the rotor 26 is performed. The rotational speed ramp DR is not subject to any closed-loop control. Preferably, the control unit 7 determines the slope and/or current strength for the start-up mode in advance. In particular, the control unit 7 does not perform any adjustment of the slope of the rotational speed ramp and/or any change of the current strength, in particular of the amplitude, of the motor current MI during the execution of the rotational speed ramp.

FIG. 4 shows a diagram in which the rotational speed DZ of the rotor 26 is plotted versus the time t. The diagram includes a first rotational speed ramp DR1 and a second rotational speed ramp DR2 as examples of the rotational speed ramp DR. The explanations relating to the rotational speed ramp DR expediently apply to the first rotational speed ramp DR1 and/or the second rotational speed ramp DR2. The rotational speed ramp DR is preferably monotonically increasing, in particular strictly monotonically increasing. Exemplarily, the rotational speed ramp DR is a straight line. In particular, the rotational speed ramp DR has a constant slope. The rotational speed ramp DR expediently starts at a rotational speed of 0 and runs at least up to the working rotational speed ADZ. The rotational speed ramp DR expediently comprises a temporal sequence of rotational speed values. The rotational speed values are shown in FIG. 4 as points lying on the rotational speed ramps DR1, DR2. The control unit 7 is designed in particular to provide a respective drive information AI for each rotational speed value, and to provide respective motor currents MI1, MI2, MI3 on the basis of the respective drive information AI. Expediently, the control unit 7 is designed to provide the motor currents MI1, MI2, MI3 with a continuously increasing frequency, so as to achieve a continuous increase in the rotational speed of the rotor 26 in accordance with the rotational speed ramp DR.

Expediently, the rotational speed ramp DR is already completely defined in the control unit 7 before the start of the rotational speed ramp DR—i.e. before the control unit 7 drives the electric motor 6 in accordance with the rotational speed ramp DR. For example, the rotational speed ramp DR, in particular the rotational speed values of the rotational speed ramp DR, is stored in the control unit 7, and preferably before the control unit 7 drives the electric motor 6 according to the rotational speed ramp DR. Furthermore, it is possible that ramp information is stored in the control unit 7 (in particular before the start of the rotational speed ramp DR), by which the rotational speed ramp DR is determined. For example, the ramp information defines the slope of the rotational speed ramp DR. In particular, the ramp information comprises a ramp increment RI that describes, for example, the rotational speed difference between two rotational speed values that directly follow one another in time in the rotational speed ramp DR. Expediently, the rotational speed values are equally spaced apart in time.

Preferably, the control unit 7 is configured to switch from the start-up mode to the working mode when the working rotational speed ADZ is reached and to perform the driving of the electric motor 6 in the working mode using a sensorless principle, in particular using a Back-EMF principle, for determining a present rotor angle and/or a present rotational speed of the electric motor 6. In particular, the control unit 7 performs closed-loop rotational speed control once the working rotational speed ADZ is reached. Provided that the target rotational speed SDZ is greater than the working rotational speed ADZ, the rotational speed can be further increased after reaching the working rotational speed ADZ in the working mode until the target rotational speed SDZ is reached. The further increase can be carried out with the same slope as the rotational speed ramp or with a different slope, as an example.

An internal mechanical load acts on the rotor 26, which internal mechanical load counteracts the increase in the rotational speed of the rotor 26 and which internal mechanical load must be overcome in the start-up mode in order to be able to increase the rotational speed of the rotor 26 up to the working rotational speed ADZ. In particular, the internal mechanical load acting on the rotor 26 is temperature dependent, in particular such that the internal mechanical load decreases as the temperature increases and increases as the temperature decreases.

Exemplarily, the temperature-dependent internal mechanical load is the moment of inertia acting on the rotor 26. In particular, this moment of inertia is dependent on the braking effect, expediently the braking force, of the braking device 34. With a stronger braking effect, in particular with a stronger braking force, the moment of inertia acting on the rotor 26 is lower than with a weaker braking effect, in particular a weaker braking force. In particular, this is because the tool 5 is rotated less quickly about the tool rotation axis 33 (in particular, less quickly than the rotational speed of the rotor 26) due to the greater braking effect. With a lower braking effect, in particular with a lower braking force, the moment of inertia acting on the rotor 26 is greater than with a stronger braking effect, in particular a greater braking force. This is due in particular to the fact that the tool 5 is rotated more quickly about the tool rotation axis 33 (for example, at the rotational speed of the rotor 26) as a result of the lower braking effect.

Exemplarily, the braking effect, in particular the braking force, of the braking device 34 is temperature dependent. For example, the coefficient of friction provided with the braking element 37 is temperature dependent. For example, the braking effect, in particular the braking force, preferably the coefficient of friction increases with increasing temperature and decreases with decreasing temperature.

The control unit 7 is expediently configured to take this temperature dependence into account in the startup mode and, in particular, to compensate for it.

Preferably, the control unit 7 is configured to set the slope of the rotational speed ramp DR based on the detected temperature. For example, the control unit 7 is configured to set a higher slope of the rotational speed ramp DR at a higher detected temperature and to set a lower slope of the rotational speed ramp DR at a lower detected temperature.

In particular, the control unit 7 is configured to selectively set a first rotational speed ramp DR1 with a first slope or a second rotational speed ramp DR2 with a second slope on the basis of the detected temperature and to use the set rotational speed ramp for the startup mode. In an example, the second slope is smaller than the first slope.

In particular, the control unit 7 is configured to set the first rotational speed ramp DR1 for the startup mode in response to the fact that the detected temperature is in a first temperature range, and to set the second rotational speed ramp DR2 for the startup mode in response to the fact that the detected temperature is in a second temperature range. The temperatures contained in the first temperature range are expediently higher than the temperatures contained in the second temperature range. The first and second temperature ranges are preferably non-overlapping.

Expediently, the first rotational speed ramp DR1 and the second rotational speed ramp DR2 are completely defined in the control unit 7, in particular before the start-up mode is performed. For example, the rotational speed ramps DR1, DR2, in particular the respective rotational speed values of the rotational speed ramps DR1, DR2 are stored in the control unit 7, preferably before the control unit 7 drives the electric motor 6 according to the selected rotational speed ramp. Furthermore, it is possible that a first ramp information and a second ramp information are stored in the control unit 7 (in particular before driving the electric motor 6 according to the selected rotational speed ramp). The first ramp information defines the first rotational speed ramp DR1, in particular its slope, and the second ramp information defines the second rotational speed ramp DR2, in particular its slope. Exemplarily, the first ramp information comprises a first ramp increment RI1 and the second ramp information comprises a second ramp increment RI2. The first ramp increment RI1 describes, for example, the rotational speed difference between two rotational speed values that directly follow each other in time in the first rotational speed ramp DR1. The second ramp increment RI2 describes, for example, the rotational speed difference between two rotational speed values that directly follow each other in time in the second rotational speed ramp DR2. For example, the first ramp increment RI1 is larger than the second ramp increment RI2.

Expediently, the control unit 7 is designed to selectively choose the first ramp information or the second ramp information based on the detected temperature and to generate the rotational speed ramp for the start-up mode based on the selected ramp information.

Preferably, the control unit 7 is configured to set the current strength of the motor current MI on the basis of the detected temperature. The current strength is set on the basis of the detected temperature in particular as an alternative to or in addition to the setting of the slope of the rotational speed ramp DR on the basis of the detected temperature explained above.

Preferably, the control unit 7 is configured to set the motor current MI with a lower current strength, in particular smaller amplitude, for a higher detected temperature and to set the motor current MI with a higher current strength, in particular larger amplitude, for a lower detected temperature. In particular, the control unit 7 is configured to set the first motor current MI1, second motor current MI2 and third motor current MI3 respectively with a higher current strength, in particular a larger amplitude, for a higher detected temperature, and to set them with a lower current strength, in particular a smaller amplitude, for a lower detected temperature.

In particular, the control unit 7 is configured to set the current strength, in particular the amplitude, of the motor currents MI1, MI2, MI3 to a first value in response to the detected temperature being in a first temperature range and to set the current strength, in particular the amplitude, of the motor currents MI1, MI2, MI3 to a second value in response to the detected temperature being in a second temperature range. The second value is expediently larger than the first value. The temperatures contained in the first temperature range are expediently higher than the temperatures contained in the second temperature range. The first and second temperature ranges are preferably non-overlapping.

Preferably, the start-up mode is configurable via the mobile device 4. For example, via the mobile device 4 it is possible to activate and/or deactivate the consideration of the temperature when setting the slope of the rotational speed ramp DR and/or the strength of the motor current MI, in particular by an input of the user. Furthermore, it is expediently possible via the mobile device 4 to set the slope of the rotational speed ramp DR and/or the strength of the motor current MI, in particular by an input of the user.

Alternatively or additionally, it is preferably possible to configure the start-up mode via the operating device 12, in particular in the aforementioned manner.

Preferably, the power tool 2 is operated according to the following method:

In a first step, the power tool 2 is switched on, in particular via the operating device 12.

In a second step, a first temperature is detected, in particular with the first temperature sensor 18. The detected first temperature is in particular an ambient temperature of the power tool 2. The detected first temperature is preferably not a motor temperature of a running electric motor.

In a third step, the control unit 7 sets a first slope of a rotational speed ramp DR for the startup mode on the basis of the detected first temperature. Alternatively or additionally, the control unit 7 sets a first current strength, in particular a first amplitude, of the motor current MI for the startup mode on the basis of the detected first temperature.

In a fourth step, the control unit 7 provides the start-up mode with the set first slope of the rotational speed ramp DR and/or the set first current strength of the motor current MI. The rotational speed of the rotor 26 is increased according to the rotational speed ramp DR, at least until the working rotational speed ADZ is reached.

In an optional fifth step, the power tool 2 is switched off (in particular via the operating device 12) and the rotational speed of the rotor 26 drops below the working rotational speed ADZ.

In an optional sixth step, the power tool 2 is switched on again.

In an optional seventh step, a second temperature is detected, in particular with the first temperature sensor 18. The second temperature detected in the seventh step differs exemplarily (in its value) from the first temperature detected in the second step.

In an optional eighth step, the control unit 7 sets a second slope of the rotational speed ramp DR for the startup mode on the basis of the detected second temperature. Alternatively or additionally, the control unit 7 sets a second current strength, in particular a second amplitude, of the motor current MI for the startup mode on the basis of the detected second temperature. The second slope and/or second current strength set in the eighth step is expediently different from the first slope and/or first current strength set in the third step.

In an optional ninth step, the control unit 7 provides the start-up mode with the set second slope of the rotational speed ramp DR and/or the set second current strength of the motor current MI. The rotational speed of the rotor 26 is increased according to the rotational speed ramp DR, at least until the working rotational speed ADZ is reached.

In particular, the aforementioned steps are carried out sequentially in time, and in the order in which they are explained above.

The invention claimed is:

1. A power tool comprising:
   a tool,
   an electric motor for driving the tool, and
   a control unit for driving the electric motor with a motor current, the control unit having a start-up mode in which the control unit drives the electric motor, so that the electric motor undergoes a rotational speed ramp during the start-up mode, in which during the rotational speed ramp, the rotational speed of the electric motor is increased continuously up to a working rotational speed, the control unit being configured to set one or more of: for the start-up mode, the slope of the rotational speed ramp on a basis of a detected temperature and for the start-up mode, a strength of the motor current on the basis of the detected temperature.

2. The power tool according to claim 1, wherein the control unit is configured to set a higher slope of the rotational speed ramp for a higher detected temperature and to set a lower slope of the rotational speed ramp for a lower detected temperature.

3. The power tool according to claim 1, wherein the control unit is configured to set the motor current with a lower current strength for a higher detected temperature and to set the motor current with a higher current strength for a lower detected temperature.

4. The power tool according to claim 1, wherein the control unit is configured to change from the starting mode to a working mode when the working rotational speed is reached and, in the working mode, to carry out the control of the electric motor using a sensorless principle for determining one or more of a present rotor angle and a present rotational speed of the electric motor.

5. The power tool according to claim 1, wherein the control unit is configured to carry out the driving of the electric motor in the start-up mode without one or more of detecting a rotor angle of the electric motor, taking into account the rotor angle of the electric motor, and a rotational speed of the electric motor.

6. The power tool according to claim 1, comprising a first temperature sensor for detecting the temperature, the first temperature sensor being spaced apart from the electric motor.

7. The power tool according to claim 1, wherein the power tool is a long-neck sander.

8. The power tool according to claim 1, comprising a braking device for braking the tool during the start-up mode, the braking effect of the braking device being temperature-dependent, and the control unit being configured to take into account the temperature dependence of the braking device via the setting of one or more of the slope and the current strength.

9. The power tool according to claim 1, further comprising an operating device via which the start-up mode can be configured.

10. A system comprising a power tool according to claim 1 and a mobile device via which the start-up mode can be configured.

11. The power tool according to claim 1, wherein the power tool is a hand-held power tool.

12. The power tool according to claim 1, wherein the power tool is a sander.

13. The power tool according to claim 6, wherein the power tool has a neck section and the electric motor is arranged on a first side of the neck section and the first temperature sensor is arranged on a second side of the neck section, the second side facing away from the electric motor.

14. A method for providing a start-up mode for a power tool comprising a tool and an electric motor for driving the tool, wherein the electric motor undergoes a rotational speed ramp during the start-up mode in which during the rotational speed ramp, the rotational speed of the electric motor is continuously increased up to a working rotational speed, the method comprising the steps:
   detecting a temperature,
   for the start-up mode, performing one or more of: setting a slope of the rotational speed ramp based on a detected temperature and setting a current strength of a motor current based on the detected temperature, and
   providing the start-up mode with the one or more of the set slope of the rotational speed ramp and the set current strength of the motor current.

15. The method of claim 14, further comprising the steps of: at a higher sensed temperature, setting a higher slope of the rotational speed ramp, and at a lower sensed temperature, setting a lower slope of the rotational speed ramp.

16. The method of claim 14, further comprising the steps of: for a higher detected temperature, setting the motor current at a lower current strength; and for a lower detected temperature, setting the motor current at a higher current strength.

17. The method according to claim 14, further comprising the steps of: upon reaching the working rotational speed, changing from the start-up mode to a working mode and, in the working mode, performing the driving of the electric motor using a sensorless principle for determining one or more of a present rotor angle and a present rotational speed of the electric motor.

18. The method according to claim 14, comprising the step of: performing the driving of the electric motor in the start-up mode without one or more of detecting a rotor angle of the electric motor, considering the rotor angle of the electric motor, and a rotational speed of the electric motor.

19. The method according to claim 14, wherein the temperature is detected with a first temperature sensor spaced from the electric motor.

20. The method according to claim 14, wherein the power tool is a long-neck sander.

\* \* \* \* \*